United States Patent
Sarh

[19]

[11] Patent Number: 6,098,260
[45] Date of Patent: *Aug. 8, 2000

[54] RIVET FASTENING SYSTEM FOR RADIAL FUSELAGE JOINTS

[75] Inventor: Branko Sarh, Huntington Beach, Calif.

[73] Assignee: McDonnell Douglas Corporation, Huntington Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/767,231

[22] Filed: Dec. 13, 1996

[51] Int. Cl.$^7$ ...................................................... B23P 21/00
[52] U.S. Cl. .................................... 29/243.53; 29/525.06; 29/33 K; 29/34 B; 29/715; 227/52
[58] Field of Search .......................... 29/525.06, 243.53, 29/714, 715, 33 K, 34 B; 244/120, 132; 243/53, 54, 55; 227/111, 15, 18, 52; 173/32

[56] References Cited

U.S. PATENT DOCUMENTS

| | | | |
|---|---|---|---|
| 641,317 | 1/1900 | Moore | 29/243.53 |
| 3,113,373 | 12/1963 | Guyer, Jr. | 29/525.06 |
| 3,485,306 | 12/1969 | Gulley | 173/32 |
| 3,534,896 | 10/1970 | Speller | 227/51 |
| 4,299,871 | 11/1981 | Forsch . | |
| 4,453,085 | 6/1984 | Pryor . | |
| 4,590,578 | 5/1986 | Barto, Jr. et al. . | |
| 4,637,761 | 1/1987 | Murray et al. . | |
| 4,662,556 | 5/1987 | Gidlund | 227/69 |
| 4,762,261 | 8/1988 | Hawly | 227/66 |
| 4,864,702 | 9/1989 | Speller, Sr. et al. | 29/34 B |
| 4,885,836 | 12/1989 | Bonomi et al. | 29/524.1 |
| 4,967,947 | 11/1990 | Sarh | 227/52 |
| 5,098,024 | 3/1992 | MacIntyre et al. . | |
| 5,555,616 | 9/1996 | Michalewski et al. | 29/509 |
| 5,586,391 | 12/1996 | Micale | 29/897.2 |
| 5,611,130 | 3/1997 | Rummell et al. | 29/34 B |
| 5,615,474 | 4/1997 | Kellner et al. | 29/703 |
| 5,664,311 | 9/1997 | Banks et al. | 29/407.04 |
| 5,896,637 | 4/1999 | Sarh . | |

OTHER PUBLICATIONS

*Linear Motion Products,* Techno–isel brochure, pp. 57, 60–63.
*Standard Endeffectars For Drilling and Rivetting,* Brotje Automation brochure.
*Seeing Is Believing,* Innovision Corp. brochure.
*Look to Lumenex for Vision System Solutions,* Lumenex brochure.

*Primary Examiner*—S. Thomas Hughes
*Assistant Examiner*—Steven A Blount
*Attorney, Agent, or Firm*—Harness Dickey & Pierce P.L.C.

[57] ABSTRACT

The present invention provides a fastening assembly system for applying fasteners along the seams of a cylindrical structure. The fastening apparatus includes a base unit which releasably attaches to a cylindrical structure, and a first fastening device coupled the base unit for applying fasteners along a seam of the cylindrical structure. The base unit may be embodied as either two crescent shaped members in parallel alignment for attaching to the upper half of the cylindrical structure. Alternatively, the base unit may include a base plate that is attachable to the floor beams on the interior of the cylindrical structure. In the preferred embodiment, the first fastening device cooperate with a second fastening device located on the opposite side of the cylindrical structure during the fastening process.

12 Claims, 8 Drawing Sheets

RIVET FASTENING SYSTEM FOR RADIAL FUSELAGE JOINTS

TECHNICAL FIELD

This invention relates to a fastening assembly system for securing seams of a cylindrical structure, and more particularly to an upper and lower riveting unit that releasably attaches to a fuselage for applying fasteners along radial joints of a fuselage.

DISCUSSION

The joining of barrel structures that comprise an aircraft fuselage is currently a manual process. During the assembly process, the barrel structures are aligned relative to each other so there exists a minimum gap along the radial boundary between barrel structures. After being positioned, the barrel structures are temporarily attached with tack rivets. Finally, the riveting process, including drilling, countersinking, applying sealant, rivet feeding and rivet upsetting, is performed to finish the joining operation.

To perform this riveting function, very large heavy machines have been developed. These machines consist of stationary steel ring structures which arc around the barrel structures and are secured to the factory floor. A riveting end effector is coupled to and walks along the ring to perform the riveting process along the outside of the barrel structure. A similar riveting end effector unit is placed inside the barrel structure on the factory floor to complement the other riveting end effector. Only open half shell structures, as opposed to a closed cylindrical structure, can be assembled with these machines because these outer and inner riveting units are heavy (up to 150 tons), and thus must be placed on the factory floor. For each additional radial joint, the barrel shell structure must be repositioned in alignment with the riveting end effectors attached to the stationary machines.

Accordingly, a need exists for an adaptable riveting system that can be moved from radial joint to radial joint and to other assembly stations within the factory so that tooling, part flow and facility layout no longer have to be adjusted to accommodate stationary riveting machines. It is further desirable that the inner riveting unit be compact and lightweight so that it can be used inside an enclosed barrel structure.

SUMMARY OF THE INVENTION

In accordance with the teachings of the present invention, a fastening assembly system is provided for applying fasteners along the seams of a cylindrical structure. The fastening apparatus includes a base unit releasably attachable to a cylindrical structure and a fastening device coupled to the base unit for applying fasteners along a seam of the cylindrical structure. The base unit may include two crescent shaped members in parallel alignment for attaching to the upper or lower half of cylindrical structure. Alternatively, the base unit may include a base plate that is attachable to the floor beams on the interior of the cylindrical structure. In both embodiments, a first fastening device cooperably operates with a second fastening device to perform the fastening process.

A method is also disclosed and claimed herein for assembling an elongated cylindrical structure. The method includes placing a first arcuate section adjacent to a second arcuate section. First and second fastening devices are then positioned along the seam between the edges of adjacent arcuate sections and in alignment with one another. Next fasteners are applied to connect the arcuate sections by cooperably operating the fastening devices. Finally, the steps are repeated to apply fasteners along the entire seam, as well as to connect additional arcuate sections to one another.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

The following description of the present invention is merely exemplary in nature and is in no way intended to limit the invention or its uses. Moreover, the following description, while depicting the fastening assembly apparatus for riveting the radial joints of an aircraft fuselage, is intended to adequately teach one skilled in the art to make and use the fastening assembly apparatus to secure seams of any relatively large structure.

Figure 1:
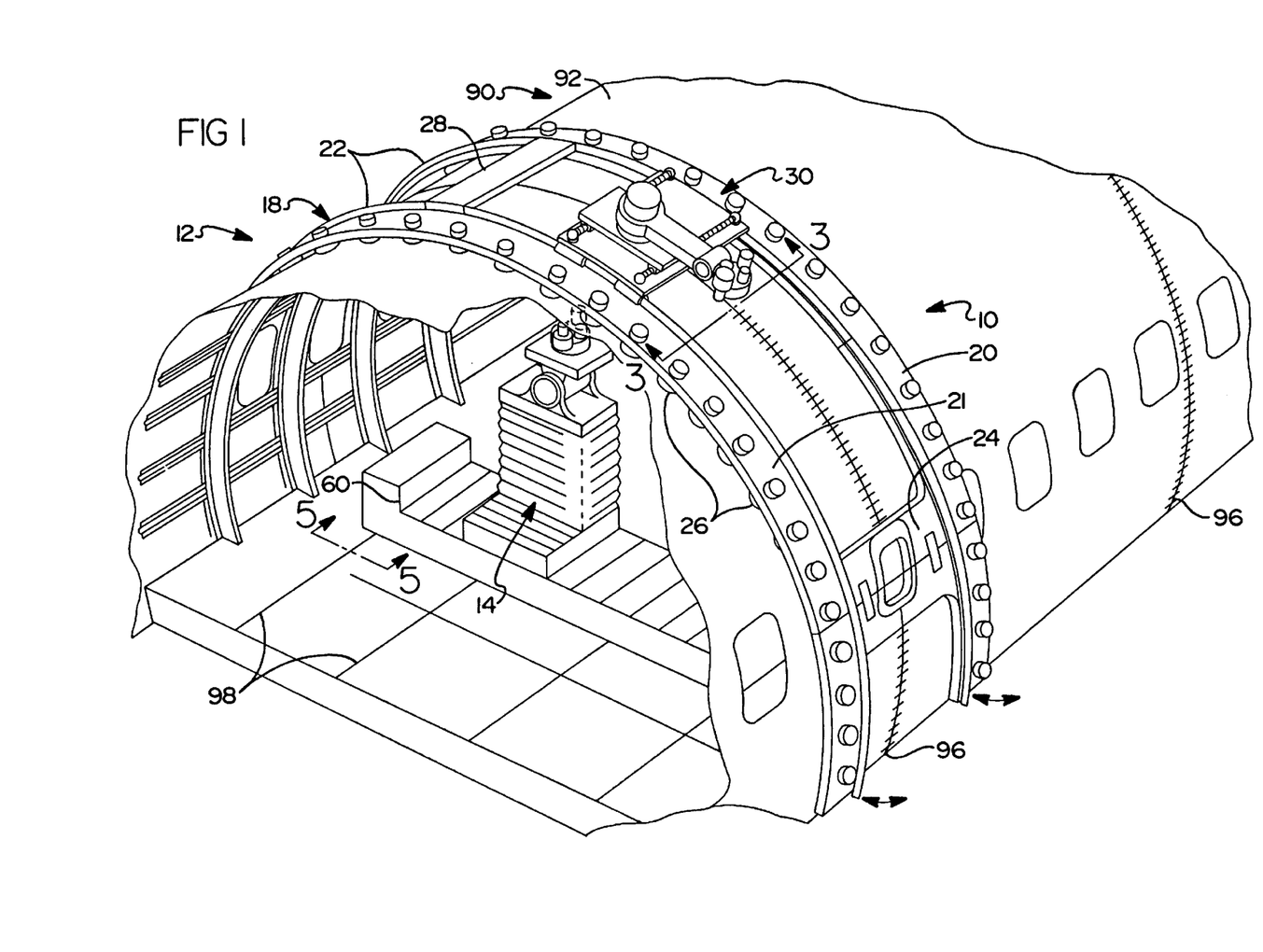
FIG. 1 is a perspective view illustrating a fastening assembly system for an upper fuselage radial joint.

As illustrated in FIG. 1, a fastening apparatus 10 includes an exterior unit 12 and an interior unit 14. Exterior unit 12 is shown to include a base unit 18 and an exterior fastening device 30. The base unit 18 releasably attaches to a work piece such as cylindrical structure 90 and the exterior fastening device 30 is coupled to the base unit 18 for movement along an outside surface of cylindrical structure 90 for applying a plurality of fasteners. Interior unit 14 is shown to move along the inside of cylindrical structure 90 to complement exterior unit 12 in the application of fasteners to the cylindrical structure 90.

In the specific application of fastening apparatus 10, shown in FIG. 1, the exterior unit 12 straddles a seam 96 along the upper half 92 of a cylindrical structure 90. Fastening apparatus 10 includes specific features allowing an operator to selectively position exterior unit 12 along seams 96 of the upper half 92 of cylindrical structure 90. Specifically, base unit 18 includes first and second crescent shaped members 20 and 21, respectively, in spread relation to one another and interconnected by a web 24. A plurality of fastening members, shown as suction cups 26, are connected to each of the first and second crescent shaped members 20 and 21, respectively, to releasably attach exterior unit 12 to the cylindrical structure 90. In addition, a transport fitting 28 connected between the crescent members 20 and 21 is used for attachment during crane transportation of the exterior unit 12. It will be appreciated that various configurations could be used for the transport fitting 28. To facilitate the adaptability and movability of the exterior unit 12, the base unit 18 should be made from aluminum, carbon fiber composites or other lightweight materials.

Figure 2:
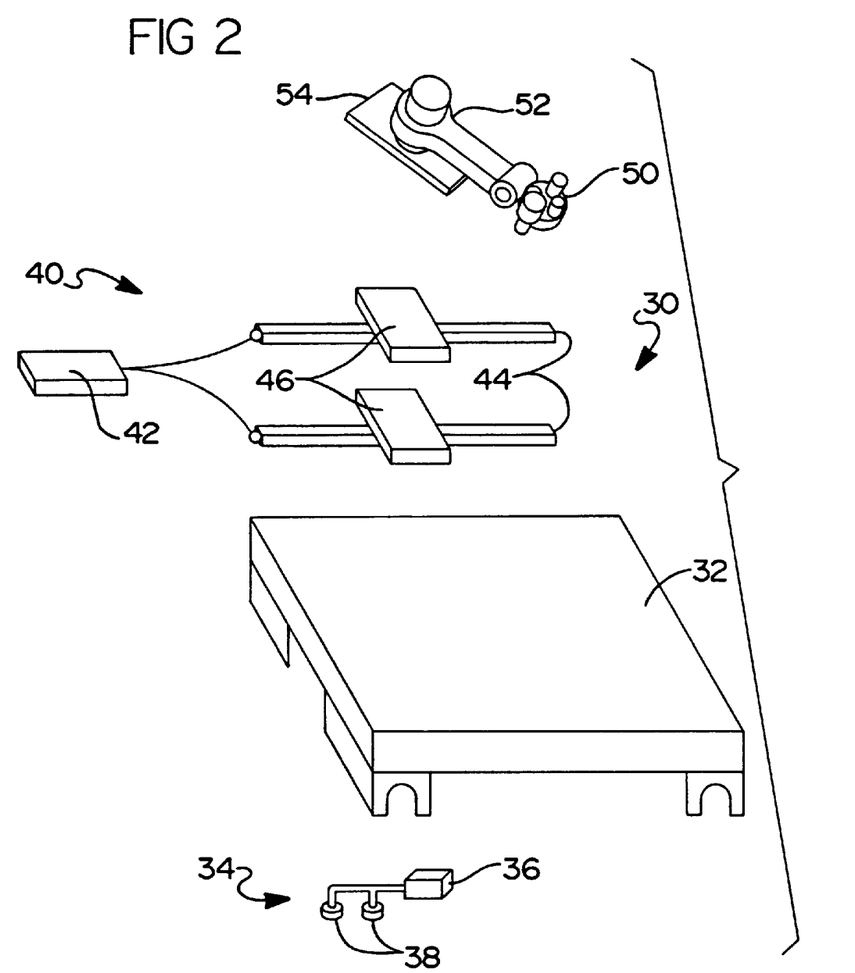
FIG. 2 is an exploded perspective view of an exterior fastening device which can be coupled to a fastening assembly system for the upper fuselage joint.
Figure 3:
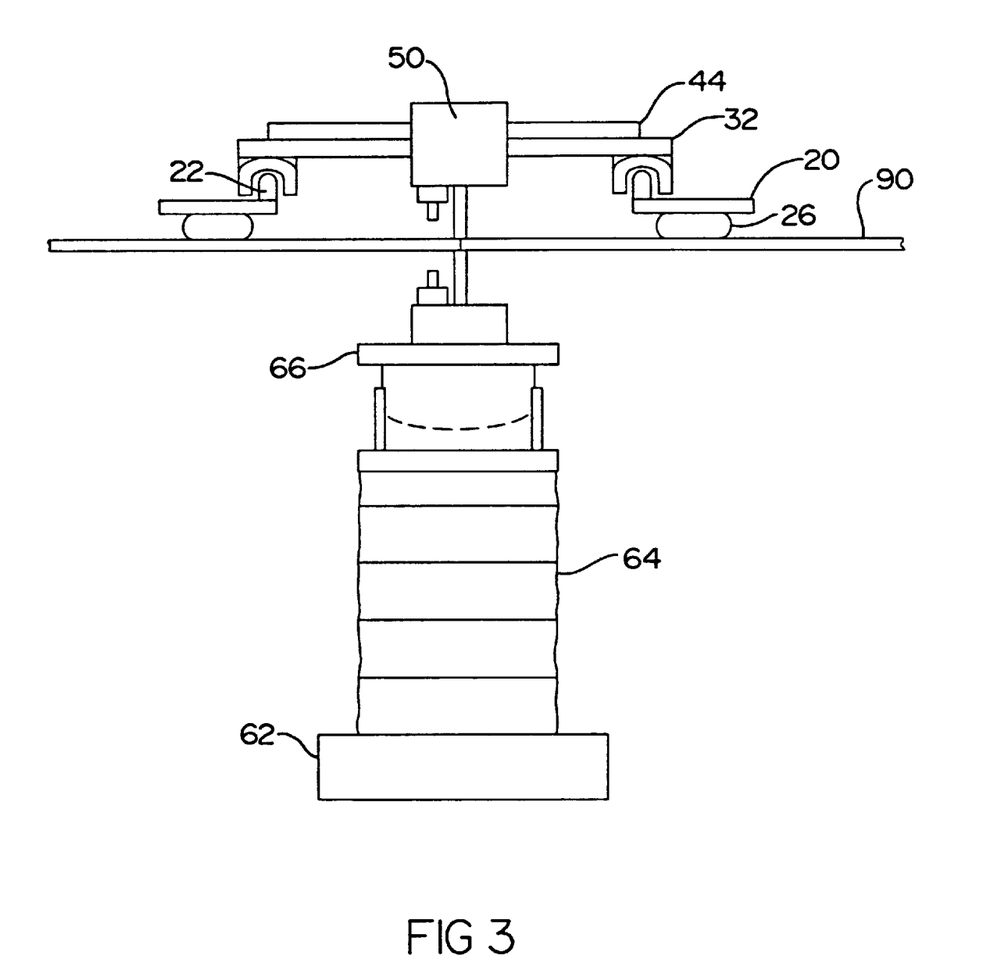
FIG. 3 is a cross-sectional view taken along the lines 3—3 of FIG. 1.

Exterior fastening device 30 is movably coupled to base unit 18. More particularly, as best seen in FIG. 2, fastening device 30 includes a multi-function end effector 50 attached to an arm 52 which couples to a plate 54. Those skilled in the art will appreciate that multi-function end effector 50 may include a variety of riveting end effector systems, such as the Drill Unit manufactured by Broetje Automation of Wieselstede, Germany. A first drive assembly is coupled between plate 54 and a larger platform 32 for laterally positioning end effector 50 relative to platform 32. Exterior fastening device 30 also includes a second drive assembly 40 coupled to the platform 32 for selectively positioning end effector 50 relative to base unit 18.

More particularly, first drive assembly 34 preferably includes a first drive motor 36 coupled to rotate one pair of wheels 38 which in turn engage one of the guide rail 22 attached to the base unit 18. It will be appreciated that first drive assembly 34 is configured to move platform 32 along the base unit 18 in response to input signals generated by manipulation of a suitable controller (not shown).

Second drive assembly 40 couples multi-function end effector 50 for movement relative to platform 32. For example, second drive assembly 40 may include the linear bearing system manufactured by Techno-isel U.S.A Division, of New Hyde Park, N.Y. Second drive assembly 40 is generally shown to include a pair of opposed, spaced apart, and parallel rails 44 each having a carriage 46 disposed thereupon for movement relative thereto. A drive motor 42 is coupled to rails 44 in a manner that moves carriages 46 in response to a control signal. For example, as in the Techno-isel device, drive motor 42 may be coupled to rotate a ball screw rotatably coupled to each rail 44 and having threads cooperative with ball nuts provided on carriage 46 thereby transferring the rotational motion of ball screw into linear motion of the ball nuts and carriage 46.

Those skilled in the art will appreciate that the exterior unit 12 of fastening assembly apparatus 10 adapts to a variety of cylindrical structures and can easily be transported between the seams 96 of cylindrical structure 90. In addition, while many of the advantages of the present invention can be realized when the exterior unit 12 is utilized alone, an interior unit 14 may also be cooperatively used in the assembly process.

Figure 4:
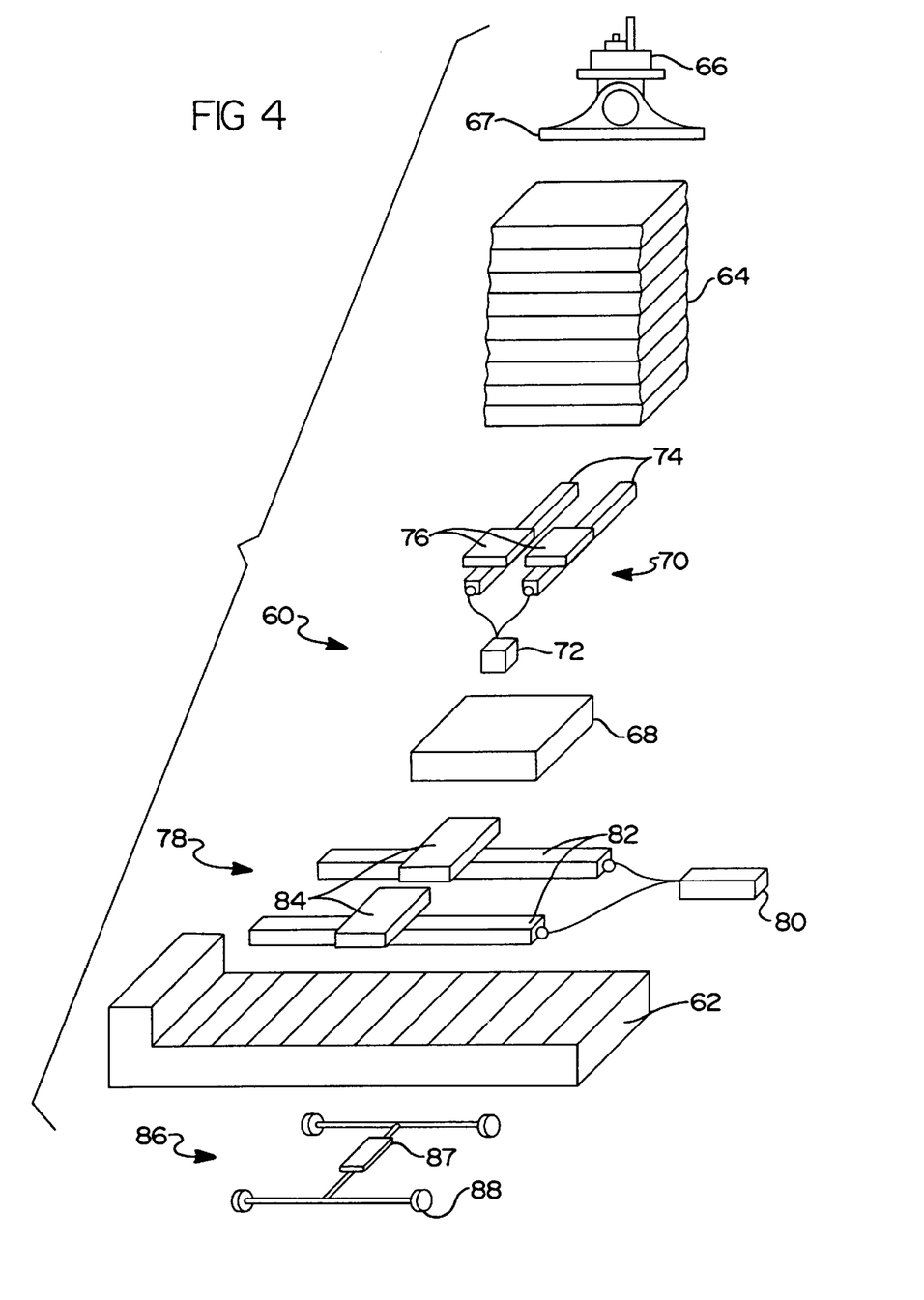
FIG. 4 is an exploded perspective view of an interior fastening device that operates on the interior of the upper half of fuselage.

Interior unit 14 includes an electronic guided vehicle 62, a telescopic tower 64 and an interior end effector 66. More particularly, interior unit 14, as best seen in FIG. 4, includes a multi-function end effector 66 coupled to a plate 67 which pivotally attaches to a telescopic tower 64. The telescopic tower 64 sits atop of an electronic guided vehicle 62 for selectively positioning end effector 66 relative to a seam 96 of cylindrical structure 90. The multi-function end effector 66 is similar to the end effector 50 of exterior fastening device 30. The telescopic tower 64 contemplated for use in the present invention is generally disclosed in U.S. Pat. No. 5,896,637 to Branko Sarh entitled Assembly Tower, which is hereby incorporated by reference.

Electronic guided vehicle 62 includes a first drive assembly 70 and a second drive assembly 78. First drive assembly 70 couples telescopic tower 64 to a base platform 68 for selectively positioning end effector 66 relative to a fastening position along the seam 96 of cylindrical structure 90. First drive assembly 70 includes a first drive motor 72 coupled to a pair of opposed, spaced apart and parallel rails 74, each having a carriage 76 disposed thereupon for transversely moving the telescopic tower 64 across the base platform 68. Second drive assembly 78 couples base platform 68 to electronic guided vehicle 62 and includes a second drive motor 80 coupled to a pair of opposed, spaced apart and parallel rails 82, each having a carriage 84 disposed thereupon for moving base platform 68 relative to electronic guided vehicle 62.

Figure 5A:
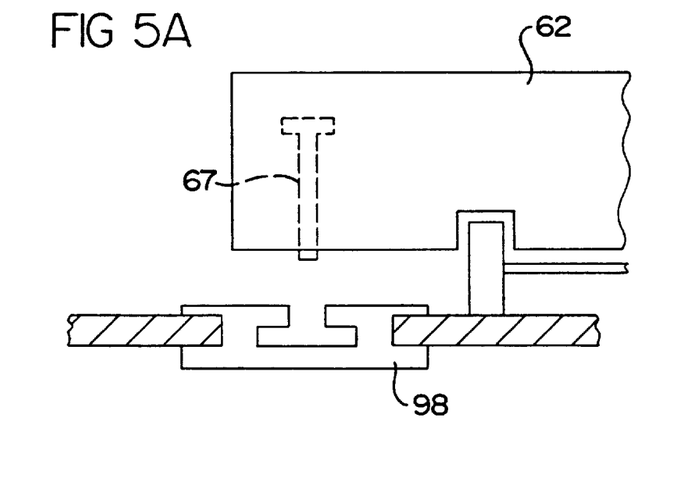
FIG. 5 is a sectional view taken along the line 5—5 of FIG. 1, illustrating an embodiment of the locking means for stabilizing the interior fastening device.
Figure 5B:
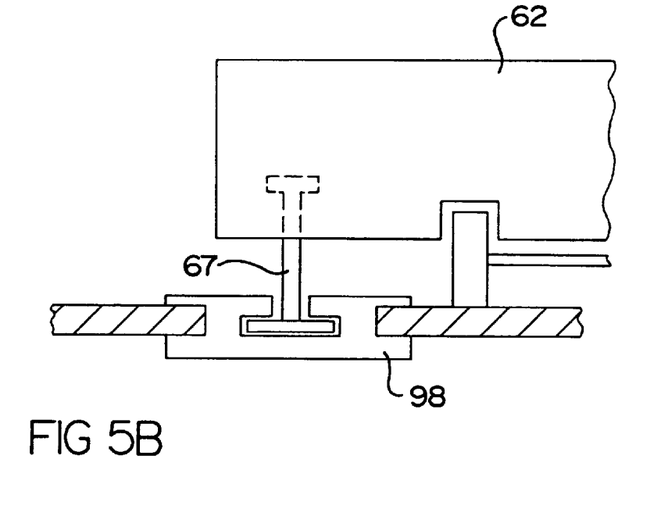

Electronic guided vehicle 62 is configured to move the interior fastening device 60 along the floor of the upper half 96 of cylindrical structure 90 in response to input signals from a suitable controller (not shown). A third drive assembly 86 attaches to the electronic guided vehicle 62 for moving the electronic guided vehicle 62 along the floor. Third drive assembly 86 includes a third drive motor 87 coupled to rotate one pair of wheels 88. In the present embodiment, a locking pin 67 is used to stabilize the position of the interior fastening device 60 relative to cylindrical structure 90. As seen in FIG. 5A, the locking pin 67 disengages the seat tracks 98 in the floor of the upper half 92 to allow the electronic guided vehicle 62 to move between seams 96. Conversely, as seen in FIG. 5B, locking pin 67 is lowered into the T-slot of the seat track 98 and rotated 90 degrees so that the protruding prongs of the locking pin 67 engage the seat track 98. It will be appreciated that various locking mechanisms can be used to engage the seat track 98 to stabilize the interior fastening device 60 during the fastening process. In addition, relative reduction in size and weight of this interior fastening device 60 allows it to be moved inside an enclosed cylindrical structure 90, such as through the passenger door of the aircraft fuselage.

In operation, the exterior unit 12 is selectively positioned along one of the seams 96, such as the radial joints of fuselage, by a crane utilizing the transport fitting 28. As previously described, suction cups 26 couple the crescent members 20 and 21 of exterior unit 12 to the upper half 92 of cylindrical structure 90 thereby stabilizing the position of base unit 18 relative to cylindrical structure 90. The exterior fastening device 30 radially moves along the outside surface of the cylindrical structure 90. The specific position of the multi-function end effector 50 of the exterior fastening device 30 is determined and adjusted by a vision system commonly known in the art such as, for example, the AdeptVision VME manufactured by Innovision Corporation of Madison, Wis. or the LumenX vision system manufactured by LumenX of Mogadore, Ohio. The vision system communicates with an automated controller (not shown) which in turn properly positions riveting multi-function end effector 50 relative to pre-drilled holes or rivets in cylindrical structure 90. A vision system is also used to position the multi-function end effector 66 of interior fastening device 60 along the same seam 96, and thus in alignment with the end effector 50 of exterior fastening device 30. Once properly positioned, exterior fastening device 30 and interior fastening device 60 cooperably perform the fastening function.

Once a fastener is delivered at the first intended location along first seam 96, the exterior fastening device 30 radially moves along the base unit 18 to the next fastening position. Similarly, the interior fastening device 60 is also moved to the next fastening position. The multi-function end effector 66 of the interior fastening device 60 is again aligned with the multi-function end effector 50 of the exterior fastening device 30 by linearly moving telescopic tower 64 relative to the electronic guided vehicle 62, by adjusting the height of the telescopic tower 64 and by radially pivoting the end effector 66 along an axis which is parallel to the centerline of the cylindrical structure 90. Cooperable fastening continues at each of the fastening positions along the remainder of the upper half 92 of cylindrical structure 90. To continue the fastening process, the exterior unit 12 is crane transported to the next seam 96 and the interior fastening device 60 is moved along the floor of the fuselage to the corresponding seam 96.

Figure 6:
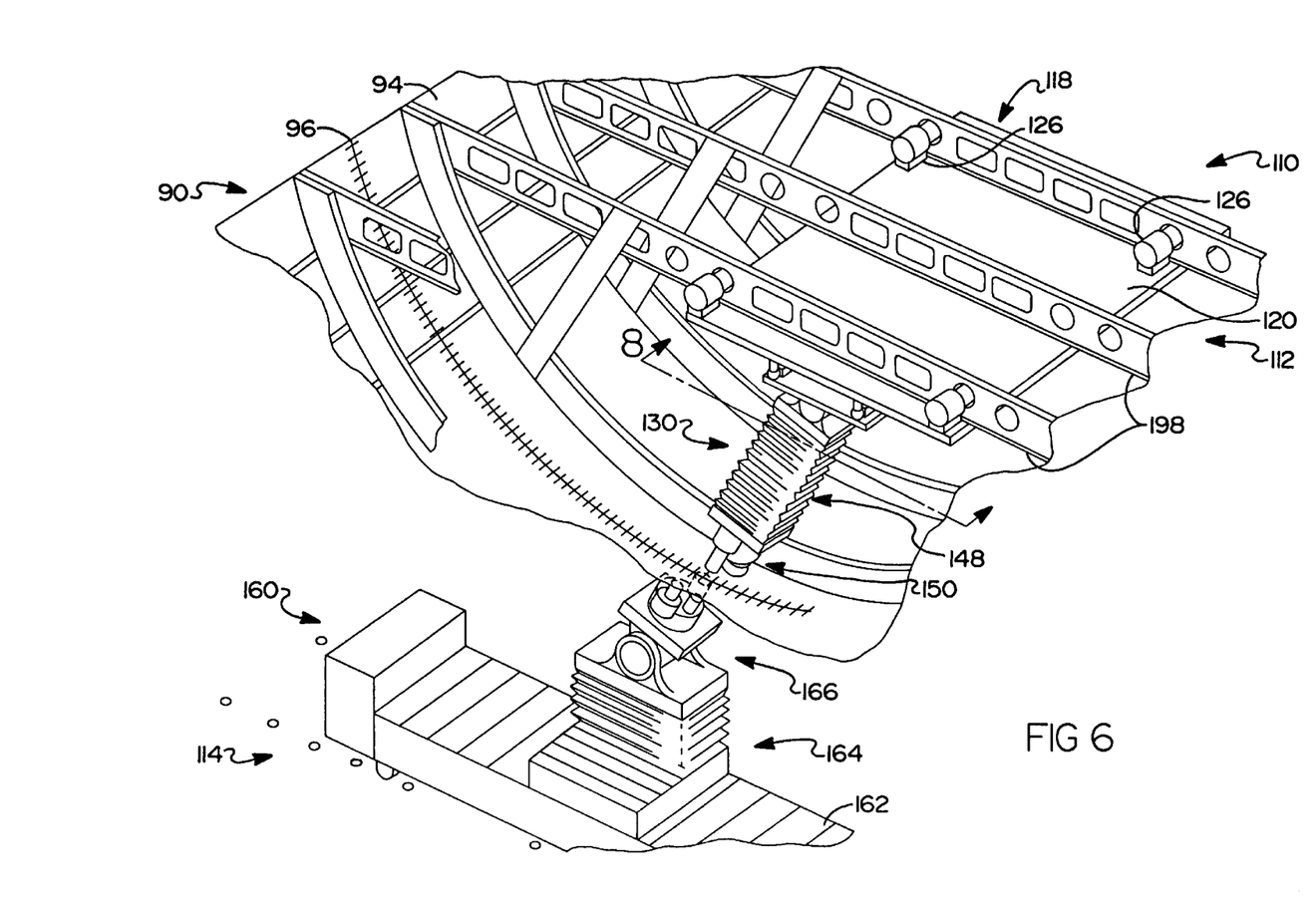
FIG. 6 is a perspective view illustrating a fastening assembly system for a lower fuselage radial joint.

Another embodiment of the fastening assembly apparatus according to the present invention illustrated in FIG. 6, wherein fastening assembly apparatus 110 is adapted to secure a seam 97 along the lower half 94 of cylindrical structure 90. More particularly, fastening assembly apparatus 110 includes an interior unit 112 and an exterior unit 114 each generally similar in structure and operation to the corresponding components of fastening apparatus 10. Accordingly, substantially identical members are referred to by substantially identical numeric reference.

Interior unit 112 of the fastening assembly apparatus 110 includes a base unit 118 which releasably attaches to the floor beams 198 of cylindrical structure 90, and an interior fastening device 130 that is coupled to move along the base unit 118. The exterior unit 114 includes an exterior fastening device 160 movable along the factory floor in close proximity to the outside of the lower half 94 of the cylindrical structure 90 to complement interior unit 112 during fastening.

More particularly, base unit 118 of the interior unit 112 includes a base plate 120 and a plurality of attachment fittings 126 for releasably attaching base plate 120 to floor beams 198 on the interior of cylindrical structure 90. As will be apparent to one skilled in the art, the fastening apparatus 110 is adaptable for attachment to the existing configuration of the interior of most cylindrical structures.

Figure 7:
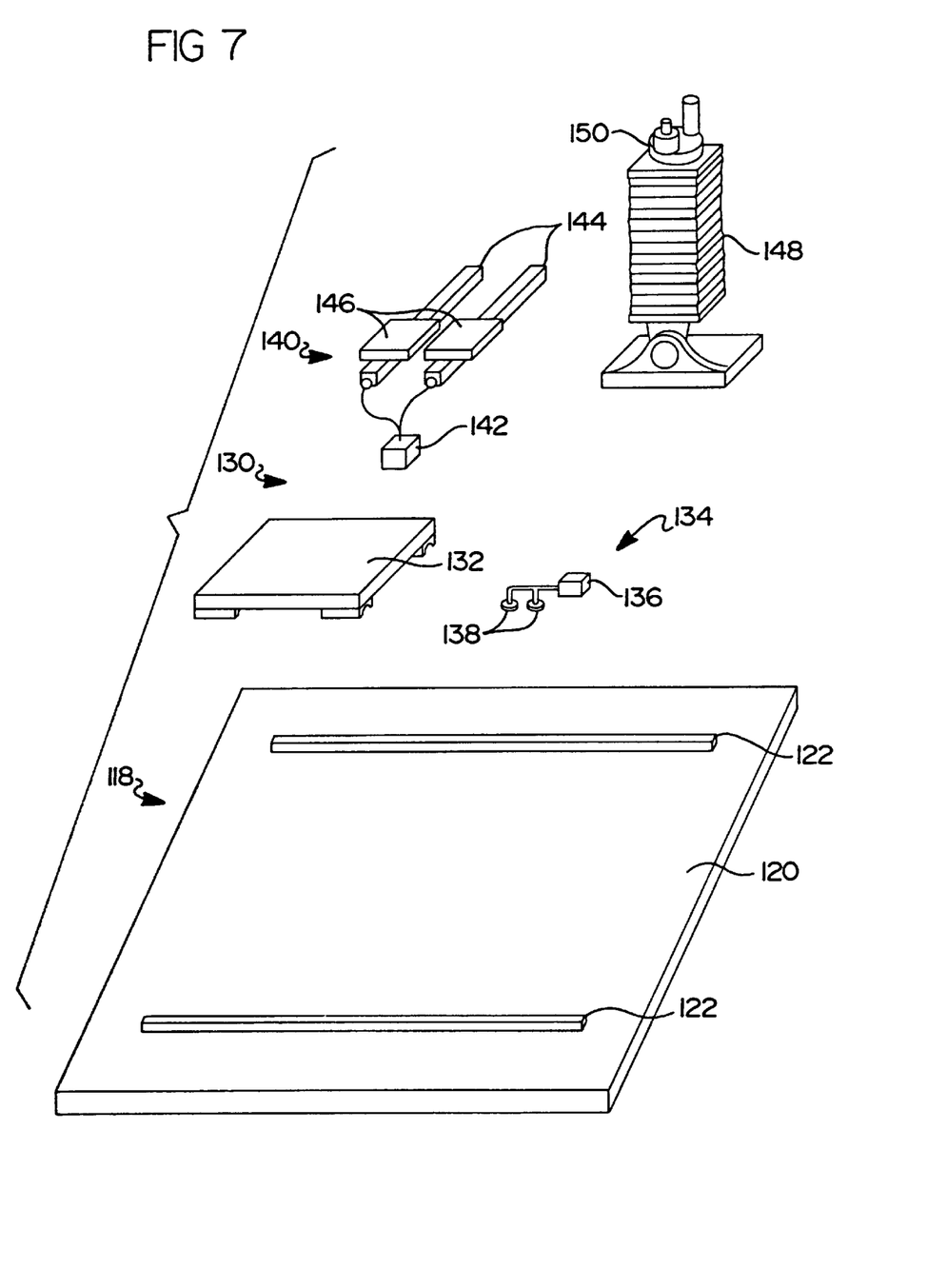
FIG. 7 is an exploded perspective view of an interior fastening device which can be coupled to fastening assembly system for the lower fuselage.
Figure 8:
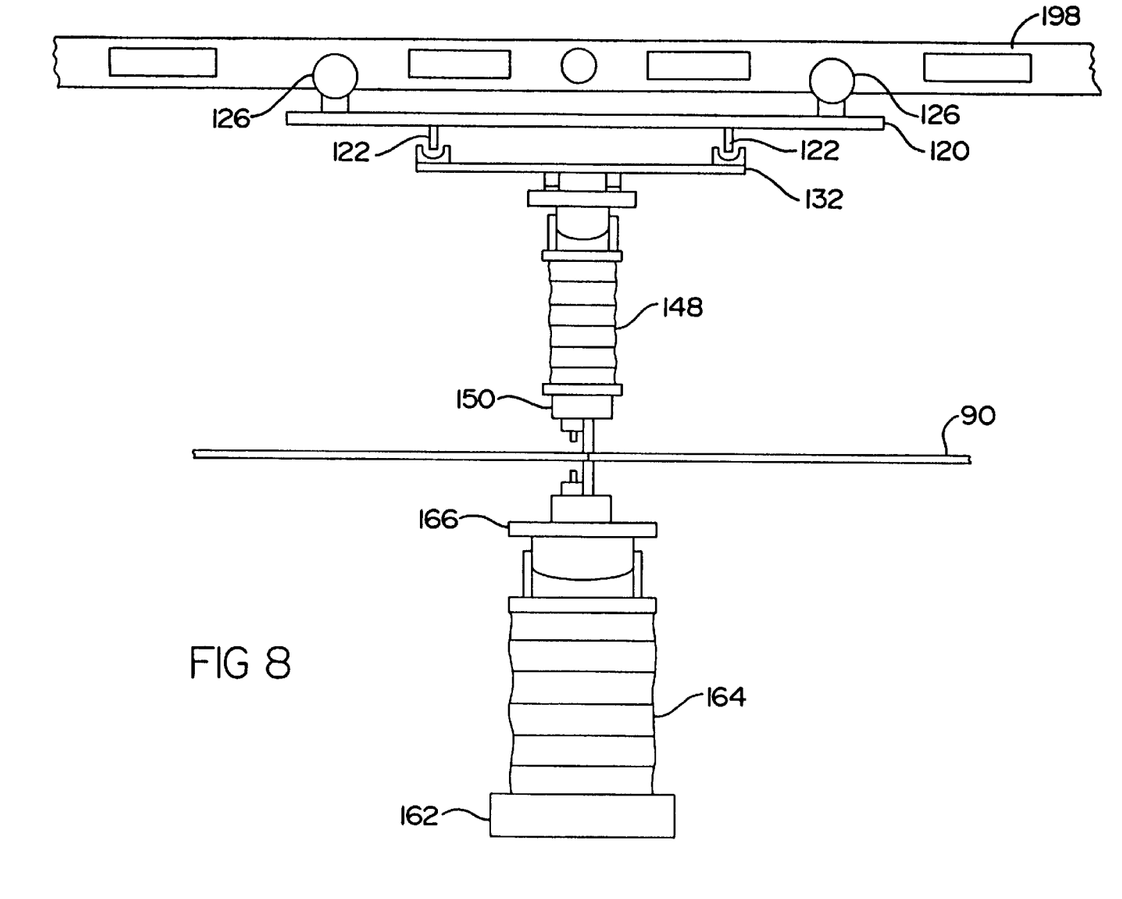
FIG. 8 is a cross-sectional view taken along the lines 8—8 of FIG. 5.

As best seen in FIG. 7, interior fastening device 130 movably couples to base plate 120. Interior fastening device 130 includes a platform 132 movably coupled a base plate 120 by a first drive assembly 134. Similarly, a second drive assembly movably couples telescopic arm 148 to platform 132. A multi-function end effector 150 is secured to telescopic arm 148 for movement in three directions relative to base plate 120. Similar to first drive assembly 34, first assembly 134 includes a first drive motor 136 coupled to rotate one pair of wheels 138 for moving the platform 132 relative to base plate 120. Likewise, second drive assembly 140 includes a second drive motor 142 coupled to parallel rails 144, each having a carriage 146 disposed thereupon for moving telescopic arm 148 relative to platform 132. Telescopic arm 148 functions the same as the telescopic tower 64 of exterior fastening device 30.

With reference to FIG. 6, the exterior fastening device 160 of fastening assembly apparatus 110 is positionable underneath the lower half 94 of the cylindrical structure 90 on the factory floor. Similar to the interior fastening device 60, the exterior fastening device 160 includes a multi-function end effector 166 connected to a telescopic tower 164 and attached to an electronic guided vehicle 162. The electronic guided vehicle 162 moves along the factory floor or may be configured to engage a guidance apparatus secured to the factory floor. Those skilled in the art will appreciate that the crescent frame structure of the first embodiment of the fastening apparatus 10 can be inverted to releasably attach to the underneath side of the lower half 94 of cylindrical structure 90 as a substitute for exterior fastening device 160. Accordingly, the fastening apparatus 10 operates substantially identical to the embodiment previous described. A transport vehicle can be used to support the fastening apparatus 10 as it moves along the floor to position the fastening apparatus 10 along an appropriate seam 196. The transport vehicle includes means to attach and detach the fastening apparatus 10 to the underneath side of the lower half 94 of cylindrical structure 90.

In operation, interior unit 112 and exterior unit 114 communicates with a vision system that positions the interior fastening device 130 and exterior fastening device 160 for fastening. More particularly, the telescopic arm 148 of interior unit 112 linearly moves along base plate 120 to position the multi-function end effector 150 along a seam 196, such as the radial joint of the fuselage. A controller (not shown) communicates with a vision system, and first and second drive assemblies 134 and 140, respectively, in a manner known in the art to position the interior fastening device 130. In a similar fashion, the exterior fastening device 160 is positioned along the same seam 196 with its end effector 166 in alignment with the end effector 150 of the interior fastening device 130. Interior fastening device 130 and exterior fastening device 160 cooperably perform the fastening function. To reposition the interior fastening device 130 at the next fastening position, the telescopic arm 148 radially pivots along an axis which is parallel to the centerline of the cylindrical structure 190, and the telescopic arm 148 extends or retracts as well as moves laterally across the base plate 120. After completing the fastening process along this seam 196, the interior unit 112 must be positioned at the next seam 196. The interior unit detaches from floor beams 198, moved and reattached at a different location to the floor beams 198 on the interior of cylindrical structure 90.

The method of the present invention will now be described. First, an edge of a first arcuate section, also commonly referenced as a barrel section, is placed adjacent to with a second arcuate section. Next, a first and second fastening device are positioned along the seam between the edges of adjacent arcuate section. A first fastening device can be placed on the exterior of the arcuate sections; whereas the second fastening device can be place in alignment with the first fastening device along interior of the arcuate sections. Cooperably operating together, the fastening devices apply fasteners to connect the arcuate sections. The fastening devices are realigned along same seam to repeat the fastening process for the entire seam. To continue assembling an elongated cylindrical structure, additional arcuate sections are placed overlapping with previously fastened arcuate sections and the fastening devices are repositioned to repeat the fastening process.

The present invention thus provides a flexible, adaptable fastening system that reduces investment cost for new assembly facilities and improves existing assembly production by using tooling already in place at the factory. In addition, the fastening assembly apparatus automates a previously manual intensive fastening process. The compact and lightweight design of this invention facilitates repositioning of the apparatus and allows for use of a second fastening device inside an enclosed cylindrical structure.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A fastening assembly apparatus for securing two cylindrical fuselage sections together at a seam formed along adjacent edge portions of each said fuselage section, said apparatus comprising:

a base unit removably securable to portions of each of said cylindrical fuselage sections generally parallel to said seam and having at least one accurate guide rail which generally follows the circumference of the cylindrical fuselage sections;

a plurality of suction elements spaced circumferentially about the base unit for releasably coupling the base unit to the fuselage sections;

a first fastening mechanism including:

a first drive assembly coupled to said guide rail and movable along a circumferential path defined by said guide rail and over said seam, and adjacent to a first surface of each of said fuselage sections;

a second drive assembly supported by said first drive assembly and movable perpendicularly to a direction of movement of said first drive assembly;

a second fastening system including;

a tower assembly movable independently of said guide rail and disposed so as to face a second surface of each of said fuselage sections for supporting a fastening tool and moving said fastening tool controllably towards and away from said second surface of each of said fuselage sections along said seam;

a fastening device supported on said tower assembly for applying a plurality of fasteners to the fuselage sections, said fastening device being movable along three axes of movement.

2. The fastening assembly apparatus of claim 1, further comprising a ground base unit coupled to said tower assembly, and an end effector movably coupled to said tower assembly.

3. The fastening assembly apparatus of claim 2 wherein said base unit includes a locking means for stabilizing the position of said ground base unit relative to a floor of said interior of the cylindrical fuselage sections.

4. The fastening assembly apparatus of claim 3, wherein said locking means includes one or more locking pins movably coupled to said ground base unit for engaging a groove defined in a seat track of said floor.

5. The fastening assembly apparatus of claim 1, wherein said base unit further comprises a base plate engageable with the interior of the cylindrical fuselage sections.

6. The fastening assembly apparatus of claim 5, wherein said suction elements for releasably attaching said base plate to the cylindrical fuselage sections includes a plurality of attachment fittings coupled to said base plate.

7. The fastening assembly apparatus of claim 1, wherein said fastening device further comprises a platform movably coupled to said guide rail, an end effect movably coupled to said platform, said first drive assembly coupled to said platform and said guide rail, for moving said platform relative to said guide rail, and said second drive assembly coupled to said end effector and said platform for moving said end effector relative to said platform.

8. The fastening assembly apparatus of claim 7, wherein said first drive assembly includes a drive motor, a guide and a carriage, said guide being coupled to one of said base and said platform, said carriage being coupled to the other of said one said base and said platform and movably engaging said guide, said drive motor coupled to said carriage to move said carriage relative to said guide.

9. The fastening assembly apparatus of claim 2, wherein said second drive assembly includes a drive motor, a guide member and a carriage, said guide member being coupled to one of said platform and said end effector, said carriage being coupled to the other of said platform and said end effector to engage said guide member, said drive motor being coupled to said carriage to move said carriage relative to said guide member.

10. The fastening assembly apparatus of claim 7, further including alignment means for locating said end effector relative to said seam of said cylindrical fuselage sections.

11. A fastening assembly apparatus for securing two cylindrical fuselage sections together at a seam formed along adjacent edge portions of each said fuselage section, said apparatus comprising:

a circumferential base unit having a pair of arcuate guide rails adapted to extend over and to follow the circumference of said two fuselage sections, said guide rails being disposed generally parallel to one another and extending generally perpendicular to a longitudinal axis extending coaxially through said fuselage section such that said guide rails are disposed on said fuselage sections on opposite sides of a seam to be formed along edges of said fuselage sections, and extend generally parallel to the seam, a plurality of suction elements carried by each of said guide rails and spaced circumferentially along each said guide rail for releasably coupling said guide rails to the fuselage sections and holding said fuselage sections in a desired orientation while said fuselage sections are being secured to one another;

a first fastening mechanism including:

a first drive assembly facing a first surface of each of said fuselage sections and coupled to said guide rails and movable along said guide rails; and a second drive assembly supported by said first drive assembly and movable perpendicularly to a direction of movement of said first drive assembly;

a second fastening system including:

a tower assembly disposed adjacent second surfaces of said fuselage sections and moveable independently of said guide rails for supporting a fastening tool, and moving said fastening tool controllably towards and away from a second surface of each of said fuselage sections; and a fastening device supported on said tower assembly for applying a plurality of fasteners to the fuselage sections, the fastening device being movable along three axes of movement.

12. The apparatus of claim 11, wherein said arcuate guide rails are adapted to extend about an arc spanning about one-half the circumference of said fuselage sections.

* * * * *